Figure 1:
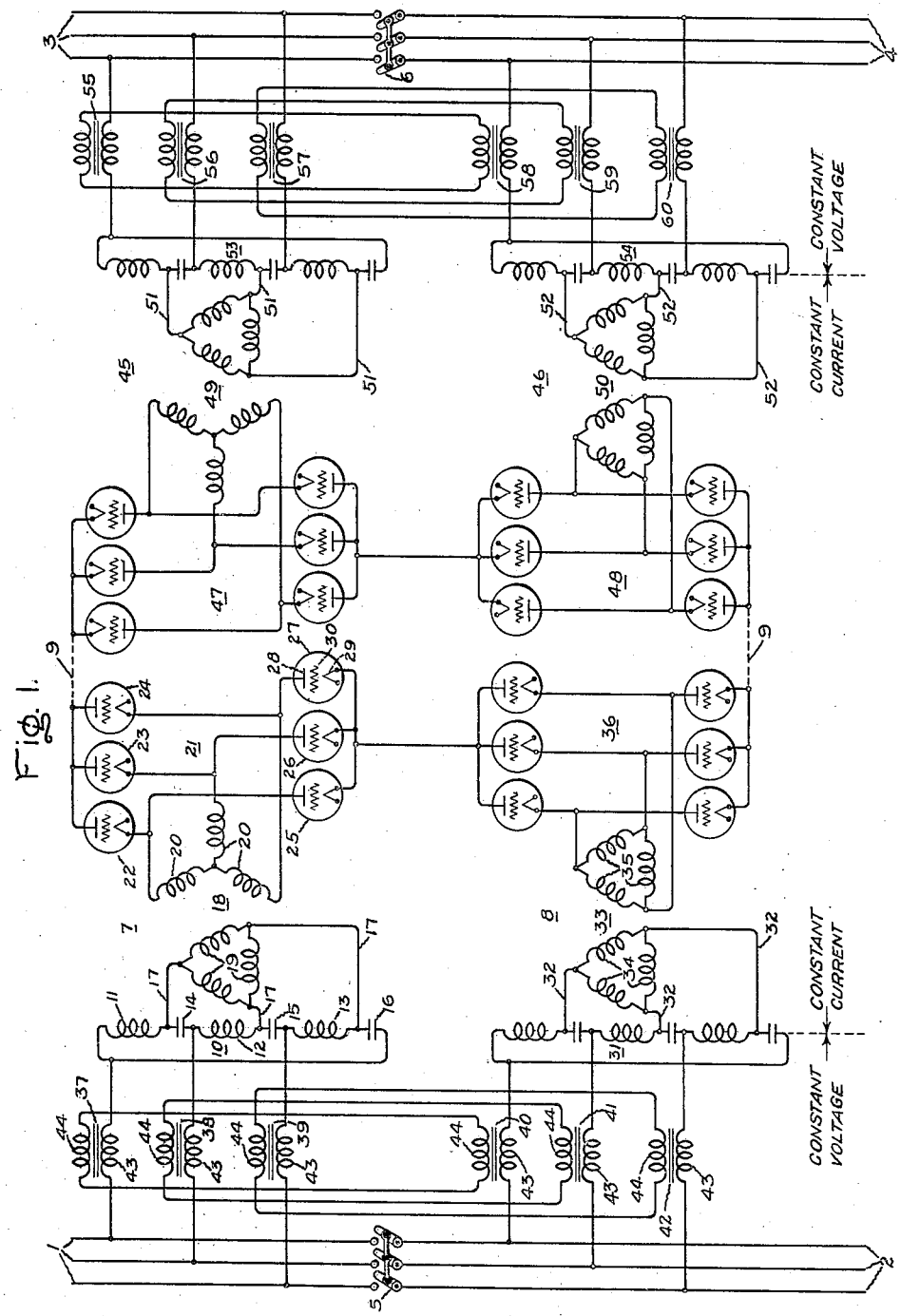

July 26, 1938.   W. W. KUYPER   2,125,115
ELECTRIC POWER SYSTEM
Filed Oct. 9, 1937   2 Sheets-Sheet 1

Inventor:
William W. Kuyper,
by Harry E. Dunham
His Attorney.

Patented July 26, 1938

2,125,115

UNITED STATES PATENT OFFICE 2,125,115

ELECTRIC POWER SYSTEM

William W. Kuyper, Marblehead, Mass., assignor to General Electric Company, a corporation of New York Application October 9, 1937, Serial No. 168,222

13 Claims. (Cl. 175—363)

My invention relates to electric power systems and more particularly to electric power transmission systems of the type disclosed and claimed in United States Letters Patent No. 1,990,758, granted February 12, 1935, on application of Charles W. Stone and assigned to the assignee of the present invention. My invention also relates to an improvement in the load controlling circuits applied to systems of this nature and is an improvement of the circuits disclosed and claimed in a copending patent application Serial No. 168,220 of Burnice D. Bedford, filed concurrently herewith and assigned to the assignee of the present application.

Briefly described, the system as disclosed in the Stone patent comprises a source of energy of constant voltage alternating current which is transformed to alternating current of constant value and then rectified by an alternating current rectifier for transmission at high voltage direct current. The constant direct current is transmitted over a transmission circuit to a receiving circuit, which includes an electric valve inverter for changing the transmitted energy to alternating current of constant value which is transformed to alternating current of constant voltage for distribution purposes or for connection with another constant voltage alternating current system. The electric valve converting circuits employ networks of the monocyclic type for transforming alternating current from constant voltage to constant current, or vice versa. These networks comprise reactances of opposite sign such as inductive reactances and capacitive reactances.

In electric power transmission systems of this type, it has been found desirable to employ a plurality of electric circuits which are interposed between a single constant voltage alternating current circuit or a plurality of constant voltage alternating current circuits and the high voltage direct current circuit to effect the most satisfactory operation of systems of this nature. When a plurality of electric circuits are so used, it has become evident that there is a decided need for arrangements to control the division of load among the various electric circuits, and furthermore, it has become evident that there is a need for apparatus which not only controls the division of load among the various circuits but also controls the current transmitted to or received from the various monocyclic networks employed in the system.

It is an object of my invention to provide a new and improved electric power transmission system.

It is another object of my invention to provide a new and improved voltage control and regulating arrangement for electric systems of the constant voltage, constant current type where transforming means, such as monocyclic networks, are employed for transforming constant voltage alternating current to alternating current of constant value.

It is a further object of my invention to provide a new and improved control and regulating arrangement, for electric systems of the constant voltage-constant current type comprising a plurality of constant voltage circuits and a plurality of constant current circuits, to maintain a predetermined division of load among the various electric circuits and for controlling the values of current in the various constant current circuits.

It is a still further object of my invention to provide a new and improved electric valve system of the type described and claimed in the above-mentioned Stone patent.

It is a still further object of my invention to provide a new and improved electric valve power transmission system of the type in which energy is transmitted in the form of high voltage, constant current, direct current and in which there is provided arrangements for controlling the division of load among the several electric circuits associated with the system.

In accordance with one feature of the illustrated embodiments of my invention, I provide a new and improved electric control arrangement for constant voltage, constant current systems where transforming means, such as monocyclic networks, are interposed between constant voltage circuits and constant current circuits for transforming constant voltage alternating current to alternating current of constant value, or vice versa. Voltage controlling means are interposed between the constant voltage circuits and the transforming means to control the voltages impressed on the transforming means in accordance with the load transferred between the constant voltage alternating current circuit and the constant current alternating current circuit.

In accordance with another feature of the illustrated embodiments of my invention, I provide a new and improved control arrangement for maintaining a predetermined division of load among a plurality of constant current alternating current circuits which are energized from a single constant voltage alternating current circuit or from a plurality of constant voltage alternating current circuits through suitable transforming means, such as monocyclic networks, which transform constant voltage alternating current to alternating current of constant value, or vice versa. The predetermined division of load among the various pairs of constant voltage-constant current circuits is maintained by controlling the voltages impressed on the respective monocyclic networks in accordance with the load transmitted between the constant voltage circuits and the constant current circuits. In one modification of my invention, the voltage controlled means comprise inductively associated devices which are controlled in accordance with the difference of load transmitted by a pair of the circuits interposed between the constant voltage circuits and the constant current circuits.

In accordance with still another feature of the illustrated embodiments of my invention, I provide a new and improved electric valve power transmission system of the type in which energy is transmitted in the form of high voltage direct current of constant value and in which energy may be transmitted between constant voltage alternating current systems. The apparatus associated with the constant voltage system comprises a plurality of electric circuits for transmitting energy between the constant voltage alternating current circuits and the direct current circuit and each includes a suitable transforming means such as a monocyclic network comprising a plurality of branches of serially connected reactances of opposite sign, such as inductances and capacitances, which transform constant voltage alternating current to alternating current of constant value, or vice versa. Each of the electric circuits includes a constant current, alternating current circuit which is connected to the monocyclic network, and includes an electric valve means which is connected between the associated constant current alternating current circuit and the constant current direct current circuit. To provide an arrangement for maintaining a predetermined division of load among the various electric circuits, I employ a plurality of inductive devices connected between the various monocyclic networks and the constant voltage alternating current circuits to control the resultant voltages impressed on the monocyclic networks in accordance with the current conducted by the other electric circuits. In accordance with one embodiment of my invention, each of the inductive devices comprises a winding which is connected in series relation with a phase conductor of the associated constant voltage circuit and also includes an inductively associated control winding which controls the resultant impedance of the series winding and hence controls the voltage impressed on the monocyclic network. The control windings of the inductive devices, connected in corresponding phase conductors of the constant voltage circuits, are connected in series relation to obtain this current balancing result.

Figure 2:
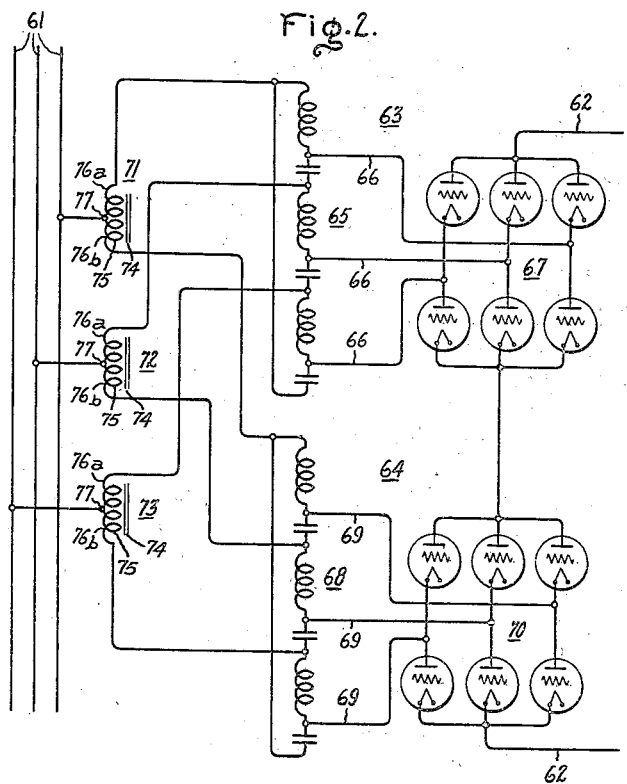

For a better understanding of my invention, reference may be had to the following description taken in connection with the accompanying drawings, and its scope will be pointed out in the appended claims. Figs. 1 and 2 of the accompanying drawings diagrammatically illustrate my invention as applied to a constant current, direct current transmission system of the type described in the above-mentioned Stone patent.

Referring now to Fig. 1 of the drawings, my invention is illustrated as applied to an electric valve power transmission system in which energy is transmitted in the form of constant current direct current. The system is shown as connected to effect transfer of energy between constant voltage circuits 1, 2 and 3, 4. Although the circuits 1, 2 and 3, 4 are represented as being separate, it is to be understood that my invention in its broader aspects also applies to systems for transmitting energy from a single constant voltage, alternating current to another single constant voltage, alternating current circuit. Circuits 1 and 2 and 3 and 4 may be connected together, if desired, by the employment of suitable switching devices 5 and 6.

Considering that portion of the electric power system associated with circuits 1 and 2, the system comprises a plurality of electric circuits 7 and 8 which are connected between circuits 1 and 2, and a constant current, direct current transmission line or circuit 9. Electric circuits 7 and 8 are essentially similar in construction and arrangement and are arranged to effect transfer of energy in either direction between circuits 1 and 2 and circuit 9. Referring to the electric circuit 7, a monocyclic network 10 comprising a plurality of branches of serially connected reactances of opposite sign, such as inductances 11, 12 and 13 and capacitances 14, 15 and 16, transforms constant voltage alternating current to alternating current of constant value, or vice versa. A constant current alternating current circuit 17 is connected to constant current terminals of the monocyclic network 10 and includes a transformer 18, having primary windings 19 and secondary windings 20, which effects the desired voltage transformation of the constant current voltage. Secondary windings 20 are connected to an electric valve translating apparatus 21 which may operate either as a full wave rectifier or as an inverter depending upon the direction of energy transfer between circuits 1 and 2 and circuits 3 and 4. The electric valve apparatus includes electric valves 22—27, each of which is preferably of the type employing an ionizable medium, such as a gas or a vapor, and each comprises an anode 28, a cathode 29 and a control member 30. When the electric valve apparatus is operating as an inverter to transform constant current direct current to alternating current of constant value, it is necessary that the control members 30 thereof be energized properly to render the electric valves conductive in a predetermined order and for predetermined recurring intervals of time, which in the three phase arrangement shown is substantially 120 electrical degrees.

Suitable excitation circuits may be employed for energizing the control members 30 of electric valves 22—28. I have found that I may employ an excitation circuit of the type disclosed and claimed in United States Letters Patent 1,935,464 granted November 14, 1933, upon an application of Clodius H. Willis and assigned to the assignee of the present application.

The electric circuit 8 is similar in arrangement to circuit 7 and includes a monocyclic network 31, a constant current alternating current circuit 32, a transformer 33 having primary windings 34 and secondary windings 35, and an electric valve translating apparatus 36. The electric valve apparatus 36 may also operate as a full wave rectifier or inverter. It will be noted that secondary windings 20 of transformer 18 in electric circuit 7 are Y-connected, whereas secondary windings 35 of transformer 33 in circuit 8 are delta connected. This arrangement effects a decrease in magnitude and a decrease in phase displacement between the current pulsations in the direct current circuit 9, and hence effects a reduction in the telephone interference factor. This feature is disclosed and claimed in a copending patent application of B. D. Bedford et al., Serial No. 97,012, filed August 20, 1936, and assigned to the assignee of the present application.

To provide an arrangement for controlling the voltages impressed on the monocyclic networks 10 and 31 in accordance with the loads transmitted by circuits 7 and 8 and to provide an arrangement for maintaining a predetermined division of load between circuits 7 and 8, I employ a plurality of reactive devices such as inductive devices 37, 38 and 39, and 40, 41 and 42, which are associated with electric circuits 7 and 8, respectively. These inductive devices control the voltages impressed on the monocyclic networks 10 and 31 in accordance with a predetermined function of load transfer, such as the difference of the load transmitted by circuits 7 and 8. The inductive devices 37—42, which may be saturable, control the voltages impressed on the associated monocyclic networks in accordance with the current transmitted by the electric circuits to maintain a predetermined division of load. Each of the inductive devices 37—42 includes a winding 43 which is connected in series relation with a phase conductor of the associated constant voltage circuit and includes an inductively associated control winding 44. Each of the inductive devices is associated with an inductive device in a corresponding phase conductor of another electric circuit. Control windings 44 of the inductive devices, connected in corresponding phase conductors, are connected in series relation to establish a current balancing circuit. For example, control windings 44 of inductive devices 37 and 40 are connected in series relation to control the effective impedances of the windings 43 in accordance with the currents flowing in the circuits.

Electric circuits 45 and 46 are connected between the constant current direct current circuit 9 and the constant voltage circuits 3 and 4, and include electric valve translating apparatus 47, 48, transformers 49, 50, constant current alternating current circuits 51 and 52, and monocyclic network 53 and 54, respectively. The electric valve apparatus 47 and 48 may also transfer energy in either direction between circuit 9 and circuits 3 and 4 and may be provided with suitable excitation circuits. Inductive devices 55—60 are arranged similarly to inductive devices 37—42 and serve to maintain a predetermined division of load between electric circuits 45 and 46.

The general principles of operation of this type of system diagrammatically shown in Fig. 1 are described in the above-mentioned Stone patent. Briefly stated, the system will function to transfer energy between the constant voltage alternating current circuits 1, 2 and 3, 4 over the constant current direct current transmission line 9, maintaining in the transmission line 9 a direct current of constant value. For the purposes of explanation, let it be assumed that energy is being transmitted from the constant voltage constant current circuits 1 and 2 to the constant voltage circuits 3 and 4. Furthermore, let it be assumed that it is desired to maintain an equal distribution of load between circuits 7 and 8 and circuits 45 and 46. The inductive devices 37—42 and 55—60 operate to maintain an equal division of current in these circuits by controlling the constant voltages of the monocyclic networks.

Under balanced conditions of operation, that is when the loads transmitted by circuits 7 and 8 are equal, the current in windings 44 of the inductive devices 37—42 will be substantially the same as that which would exist if these windings were short circuited. Thus, the voltage across the terminals of the windings 44 is substantially zero under this condition of operation. If it be assumed that circuit 7 tends to carry more power than circuit 8, windings 44 of inductive devices 37—39 will attempt to send more current through the circuits including windings 44 of devices 40—42. The net result will be a small change in the currents carried by each of the closed circuits including windings 44. The effect of this change of current will be to induce voltages in the primary windings 43 of inductive devices 37—42. These induced voltages will be in a direction tending to reduce the voltage applied to the monocyclic network 10 and tending to increase the voltage applied to the monocyclic network 31. This change of voltage applied to the monocyclic networks effects a balance of the power flow between circuits 7 and 8. The operation of the inductive devices 37—42 is similar when the power flow is in the reverse direction, that is, when power is flowing from circuit 3 to circuit 1.

The arrangement diagrammatically shown in Fig. 2 illustrates another embodiment of my invention for maintaining a predetermined division of load among several electric circuits for transmitting energy between a constant voltage alternating current circuit 61 and a constant current direct current circuit 62. In the arrangement of Fig. 2 there is shown another system for controlling the voltages impressed on the monocyclic networks in accordance with the loads transmitted by the various circuits. Electric circuits 63 and 64 are connected between the constant voltage circuit 61 and the direct current circuit 62 to transmit energy therebetween. Circuit 63 includes a monocyclic network 65, a constant current alternating current circuit 66 and an electric valve translating apparatus 67; and circuit 64 includes a monocyclic network 68, a constant current alternating current circuit 69 and an electric valve apparatus 70.

To maintain a predetermined division of load between electric circuits 63 and 64, I provide reactors 71, 72 and 73 which may or may not have magnetic core members 74 and which may be saturable. Each of the reactors 71, 72 and 73 may be of the differential type and may include a current balancing winding 75 having terminal connections 76a and 76b and an electrical intermediate connection 77. By controlling the number of turns and the position of the electrical intermediate connection 77, I provide an arrangement for controlling the amount of load transmitted over electric circuits 63 and 64. The electrical intermediate connections 77 are connected to different phase conductors of the constant voltage circuit 61, and the terminals 76a and 76b are connected to corresponding points or terminals of the monocyclic networks 65 and 68, respectively.

The operation of the embodiment of my invention shown in Fig. 2 is substantially the same as that explained above in connection with the arrangement of Fig. 1. The reactors 71—73 function to maintain a predetermined division of load between electric circuits 63 and 64. When the intermediate connections 77 are in the electrical neutral position, that is when the turns between connection 77 and terminals 76a and 76b are equal, there will be maintained an equal division of current between circuits 63 and 64. During normal operation when the electric circuits 63 and 64 are carrying equal amounts of load, since the currents flowing from terminals 76a and 76b of the reactors 71—73 are equal and opposite the net magnetomotive force acting on the core members 64 will be zero. If, for example, circuit 63 momentarily assumes an increment of load to disturb this balance, there will be induced in the two portions of these windings voltages which tend to decrease the current in circuit 63 and which tend to increase the current in circuit 64.

In other words, any unbalance in the currents of the circuits will produce fluxes in the cores 74 which will induce a bucking voltage in the portion of the winding carrying the higher current and a boosting voltage in the portion of the winding carrying the lower current. It is to be understood that the electrically intermediate connection 77 may be adjusted to maintain any predetermined ratio of currents conducted by circuits 63 and 64, and that the reactors 71—73 perform in the above described manner to maintain the desired division of load.

When the reactors 71—73 are of the saturable type, the amount of load balancing effect between circuits 63 and 64 will, of course, be limited by the design of the reactors. Furthermore, the reactors may be designed to limit the load balancing function to a desired value in the event one of the electric circuits is subjected to a fault condition, thereby permitting the other circuit to carry a predetermined portion of the load.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a constant voltage alternating current circuit, a constant current direct current circuit, a plurality of electric circuits connected between said constant voltage circuit and said direct current circuit and each including a monocyclic network for transforming constant voltage alternating current into alternating current of constant value and an electric valve means connected between the monocyclic network and the direct current circuit, and means connected between the monocyclic networks and the constant voltage circuit for controlling the voltages impressed on said monocyclic networks to maintain a predetermined division of load among said electric circuits.

2. In combination, a constant voltage alternating current circuit, a constant current direct current circuit, and a plurality of electric circuits connected between said constant voltage circuit and said direct current circuit for transmitting energy therebetween and each comprising a monocyclic network including reactances of opposite sign for transforming constant voltage alternating current into alternating current of constant value, electric valve means connected between the associated monocyclic network and the direct current circuit and inductive devices connected in series relation with the monocyclic networks for controlling the voltages impressed thereon in accordance with the current conducted by another circuit of said plurality of circuits to maintain a predetermined division of load thereamong.

3. In combination, a plurality of constant voltage alternating current circuits, a constant current direct current circuit, a plurality of electric circuits each connected between a different one of said constant voltage circuits and said direct current circuit for transmitting energy therebetween and each comprising a monocyclic network including reactances of opposite sign for transforming constant voltage alternating current into alternating current of constant value and electric valve means connected between the monocyclic network and the direct current circuit, and a plurality of inductive devices connected in series relation with the respective monocyclic networks and including windings connected in series relation therewith to control the voltages impressed on said monocyclic networks to maintain a predetermined division of load among said electric circuits.

4. In combination, a plurality of constant voltage alternating current circuits, a constant current direct current circuit, a plurality of electric circuits each connected between a different one of said constant voltage alternating current circuits and said direct current circuit for transmitting energy therebetween and each comprising a monocyclic network for transforming constant voltage alternating current into alternating current of constant value and electric valve means connected between the monocyclic network and the direct current circuit, the various electric valve means being connected in series relation, and a plurality of inductive devices connected between the associated constant voltage alternating current circuits and the monocyclic networks, each of said inductive devices including a winding connected in series relation with a phase conductor and including a control winding energized in accordance with the current of the corresponding phase conductor of another of said electric circuits to control the impedance of said first mentioned winding to maintain a predetermined division of load among the various electric circuits.

5. In combination, a constant voltage alternating current circuit, a constant current direct current circuit, a plurality of electric circuits for transmitting energy between said constant voltage circuit and said direct current circuit, each comprising a monocyclic network for transforming constant voltage alternating current into alternating current of constant value and electric valve means connected between the monocyclic network and the direct current circuit, and a plurality of reactors having terminal connections and an electrical intermediate connection for maintaining a predetermined division of load among said electric circuits, terminal connections of said reactors being connected to corresponding points of said monocyclic networks and the electrical intermediate connections being connected to different phase conductors of said constant voltage alternating current circuit.

6. In combination, a constant voltage alternating current circuit comprising a plurality of phase conductors, a constant current direct current circuit, a pair of electric circuits for transmitting energy between said constant voltage circuit and said direct current circuit and each comprising a monocyclic network for transforming constant voltage alternating current into alternating current of constant value, a constant current alternating current circuit and electric valve means connected between the constant current alternating current circuit and the direct current circuit, and a plurality of reactors for controlling the voltages impressed on the monocyclic networks to maintain a predetermined division of load between said pair of circuits and each comprising a pair of terminal connections and an electrical intermediate connection, said terminal connections being connected to corresponding terminals of the monocyclic networks in said pair of circuits and the electrical intermediate connections each being connected to a different one of said phase conductors.

7. In combination, a constant voltage alternating current circuit, a constant current direct current circuit, a plurality of electric circuits connected between said constant voltage circuit and said direct current circuit for transmitting energy therebetween and each including a monocyclic network for transforming constant voltage alternating current into alternating current of constant value and an electric valve means connected between the monocyclic network and the direct current circuit, and a saturable inductive reactance connected between the monocyclic networks and the constant voltage circuit for controlling the voltages impressed on said monocyclic networks to maintain a predetermined division of load among said circuits and for limiting the load conducted by one of said circuits in the event another of said circuits becomes defective.

8. In combination, a plurality of constant voltage alternating current circuits, a plurality of constant current alternating current circuits, means connected in each pair of constant voltage-constant current circuits for transforming constant voltage alternating current into alternating current of constant value, and means connected between the respective constant voltage alternating current circuits and the associated transforming means for controlling the voltage impressed on the transforming means.

9. In combination, a plurality of constant voltage alternating current circuits, a plurality of constant current alternating current circuits, means connected in each pair of constant voltage-constant current circuits comprising a monocyclic network for transforming constant voltage alternating current into alternating current of constant value, and means connected between the various constant voltage circuits and the associated monocyclic networks to control the voltages impressed thereon in accordance with the load transmitted between said constant voltage circuits and said constant current circuits.

10. In combination, a plurality of constant voltage alternating current circuits, a plurality of constant current alternating current circuits, means connected between each pair of constant voltage-constant current circuits for transforming constant voltage alternating current into alternating current of constant value, and means connected between the various constant voltage circuits and the associated transforming means for controlling the voltages impressed thereon to maintain a predetermined division of load among the constant current alternating current circuits.

11. In combination, a constant voltage alternating current circuit, a plurality of constant current alternating current circuits, individual means connected to each of said constant current alternating current circuits for transforming constant voltage alternating current into alternating current of constant value, and reactive means connected between said constant voltage circuit and said individual means for controlling the voltages impressed thereon to maintain a predetermined division of load among said constant current circuits.

12. In combination, a constant voltage alternating current circuit, a plurality of constant current alternating current circuits, a plurality of monocyclic networks each connected to a different one of said constant current circuits for transforming constant voltage alternating current into alternating current of constant value, and reactive means connected between said constant voltage circuit and the monocyclic networks for controlling the voltages impressed thereon to maintain a predetermined division of load among said constant current circuits and for controlling the magnitudes of the currents therein.

13. In combination, a constant voltage alternating current circuit, a pair of constant current alternating current circuits, a pair of monocyclic networks each connected to a different constant current circuit for transforming constant voltage alternating current into alternating current of constant value, and a differential inductive reactance connected between said constant voltage circuit and said monocyclic networks for maintaining a predetermined division of load between said constant current circuits.

WILLIAM W. KUYPER.

CERTIFICATE OF CORRECTION.

Patent No. 2,125,115.                      July 26, 1938.

WILLIAM W. KUYPER.

It is hereby certified that error appears in the printed specification of the above numbered patent requiring correction as follows: Page 2, first column, line 12, for "controlled" read controlling; and second column, line 45, after "apparatus" insert the reference numeral 21; and that the said Letters Patent should be read with this correction therein that the same may conform to the record of the case in the Patent Office.

Signed and sealed this 13th day of September, A. D. 1938.

Henry Van Arsdale (Seal)                                    Acting Commissioner of Patents.